April 29, 1947. W. P. NORTON 2,419,850
VARIABLE SPEED POWER TRANSMISSION
Filed Feb. 29, 1944 4 Sheets-Sheet 4
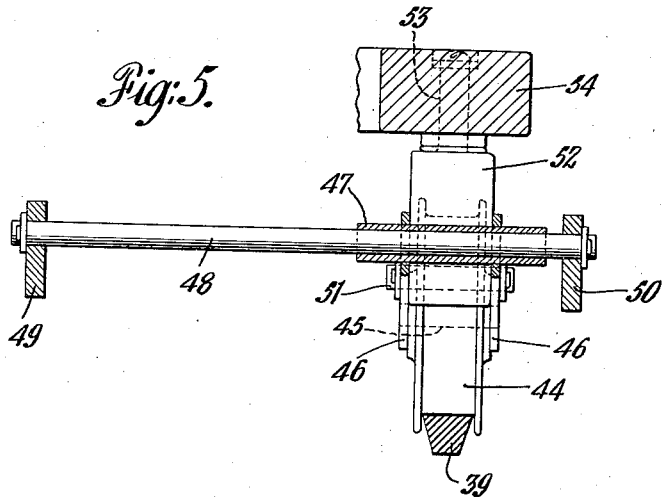
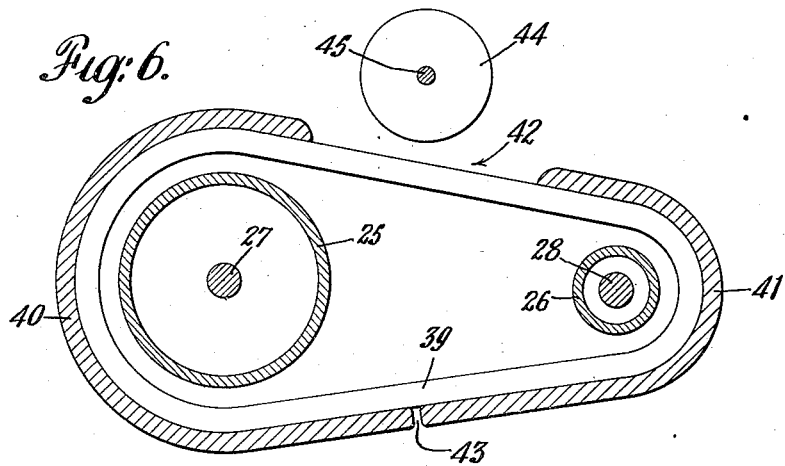
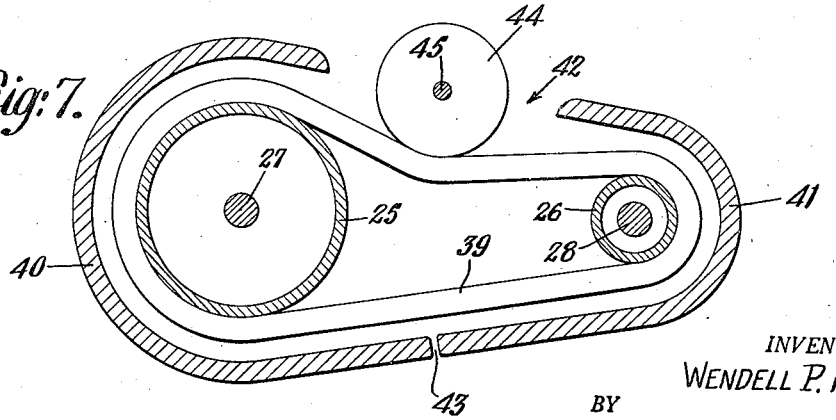
INVENTOR.
WENDELL P. NORTON
BY
H. G. Manning
Attorney Patented Apr. 29, 1947

2,419,850

UNITED STATES PATENT OFFICE 2,419,850

VARIABLE SPEED POWER TRANSMISSION

Wendell P. Norton, Torrington, Conn.

Application February 29, 1944, Serial No. 524,352

12 Claims. (Cl. 74—217)

This invention relates to driving mechanisms, and more particularly to a belt-driven variable speed power transmission, which is especially adapted to transmit power to lathes, or any other power-driven light machinery.

One object of the present invention is to produce a power transmission of the above nature having a row of aligned "oval" belts positioned around two pairs of stepped cones, and in which any desired belt may be selectively put into operation by swinging a manually-operated lever-carried idler pulley into contact with the intermediate portion of the desired belt.

A further object is to provide a transmission of the above nature in which the belts will be mounted independently of each other, and when out of use will be free from contact with the stepped cones.

A further object is to provide a power transmission of the above nature in which means are provided for dampening the vibration of the shifting lever caused by lack of uniformity in the driving belts.

A further object is to provide a power transmission of the above nature in which the shifting lever has means to receive variable weights whereby the operating pressure of the idler pulley on the belts may be controlled.

A further object is to provide a power transmission of the above nature in which means are provided to guide and hold the shifting lever with its idler pulley in alignment with any desired belt.

A further object is to provide a power transmission of the above nature having an adjustable split oval casing surrounding and spaced from the stepped cones, and with which the belts are engaged when at rest and out of driving position.

A further object is to provide a machine of the above nature in which the oval belts remain permanently within the oval casings surrounding the pairs of stepped cones.

A further object is to provide a machine of the above nature which may be readily knocked down to permit the replacement of the belts.

A further object is to provide a power transmission of the above nature which will be simple in construction, inexpensive to manufacture, easy to install, manipulate, and adjust for wear, compact, ornamental in appearance, which will operate with the minimum of vibration, noise, and power consumption, and which will be very efficient and durable in use.

With these and other objects in view, there has been illustrated on the accompanying drawings one form in which the invention may conveniently be embodied in practice.

In the drawings,

Fig. 5 is a detail sectional view taken along the line 5—5 of Fig. 1.

Figs. 6 and 7 represent diagrammatic views of the transmission, showing one of the driving belts in idle position and driving position, respectively.

Figure 1:
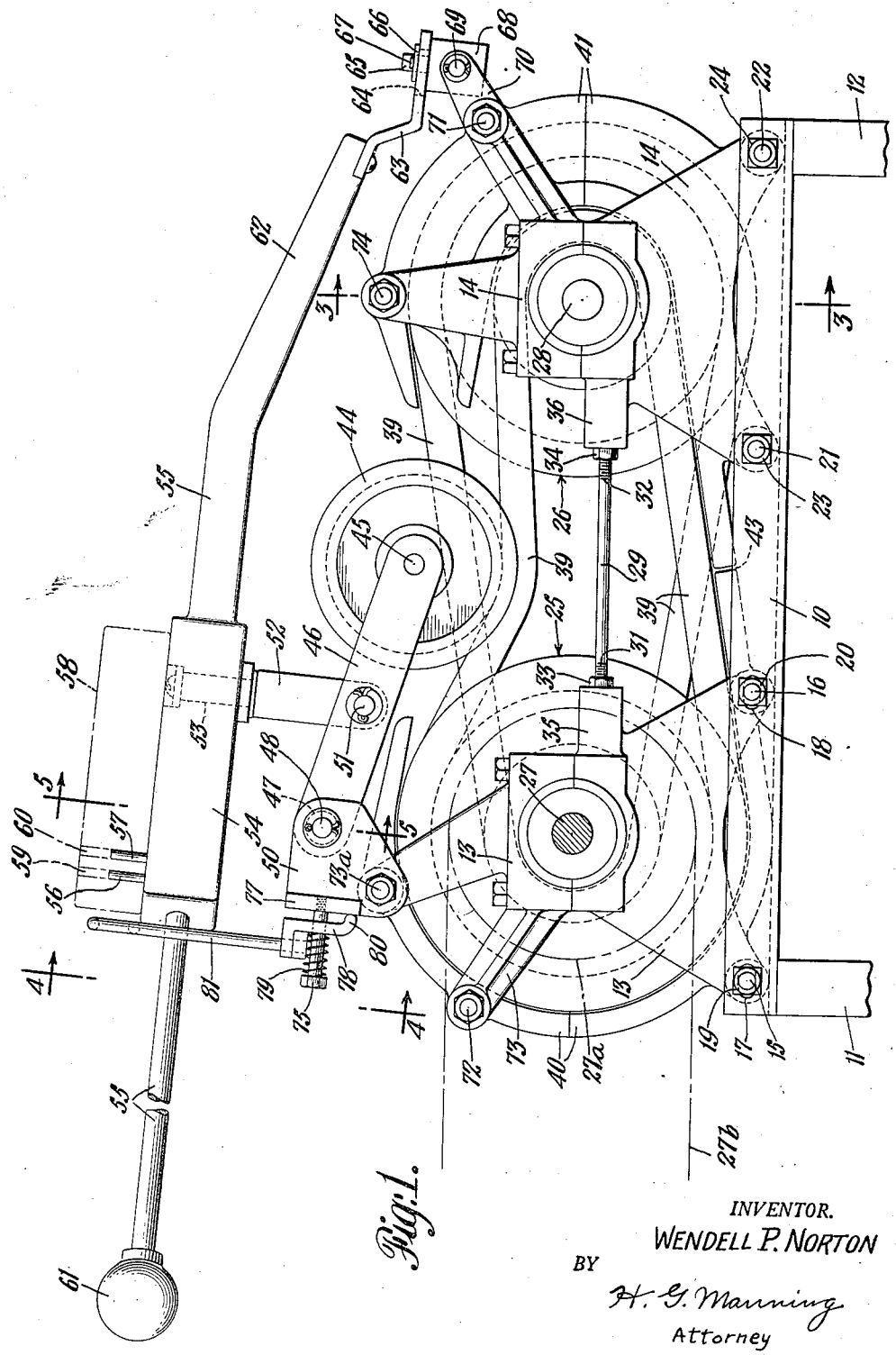
Fig. 1 represents a side view of the power transmission unit.

In the present invention, provision is made of two opposed sets of stepped cones mounted upon parallel shafts, the steps of each cone being grooved to fit the regular standard V-type belts. Each pair of cooperating cones has its own individual belt, thus eliminating all changing of belts, and providing as many belts as there are cones required to give the desired number of speeds.

Each belt when not in use will be maintained in oval shape and in alignment but out of contact with a pair of opposed steps of the cones, and surrounding each belt is an oval two-part guard casing which is made sufficiently larger than the steps of said cones so that when the belt is in use it will be free and clear from said belts and cone steps.

This construction permits the unhampered rotation of the pulleys and their shafts when the belts are idle. Whenever desired, however, the operator, by manually swinging the shifting lever, may move the idler pulley laterally and down against any one of the various belts which he may select. It is to be understood, of course, that when one belt is in driving position surrounding and engaging a particular pair of pulleys, all the other belts will be idle and at rest awaiting their selection.

The present construction lends itself especially to modern motor-driven low-power variable speed machines, as it provides the smoothness of action and quietness necessary for the production of fine work.

Referring now to the drawings, in which like reference numerals denote corresponding parts throughout the several views, the numeral 10 indicates the base of the machine which rests upon two pairs of supporting legs 11, 11 and 12, 12. Mounted on the base 10 are two pairs of opposite end bearing frames 13, 13 and 14, 14.

Figure 2:
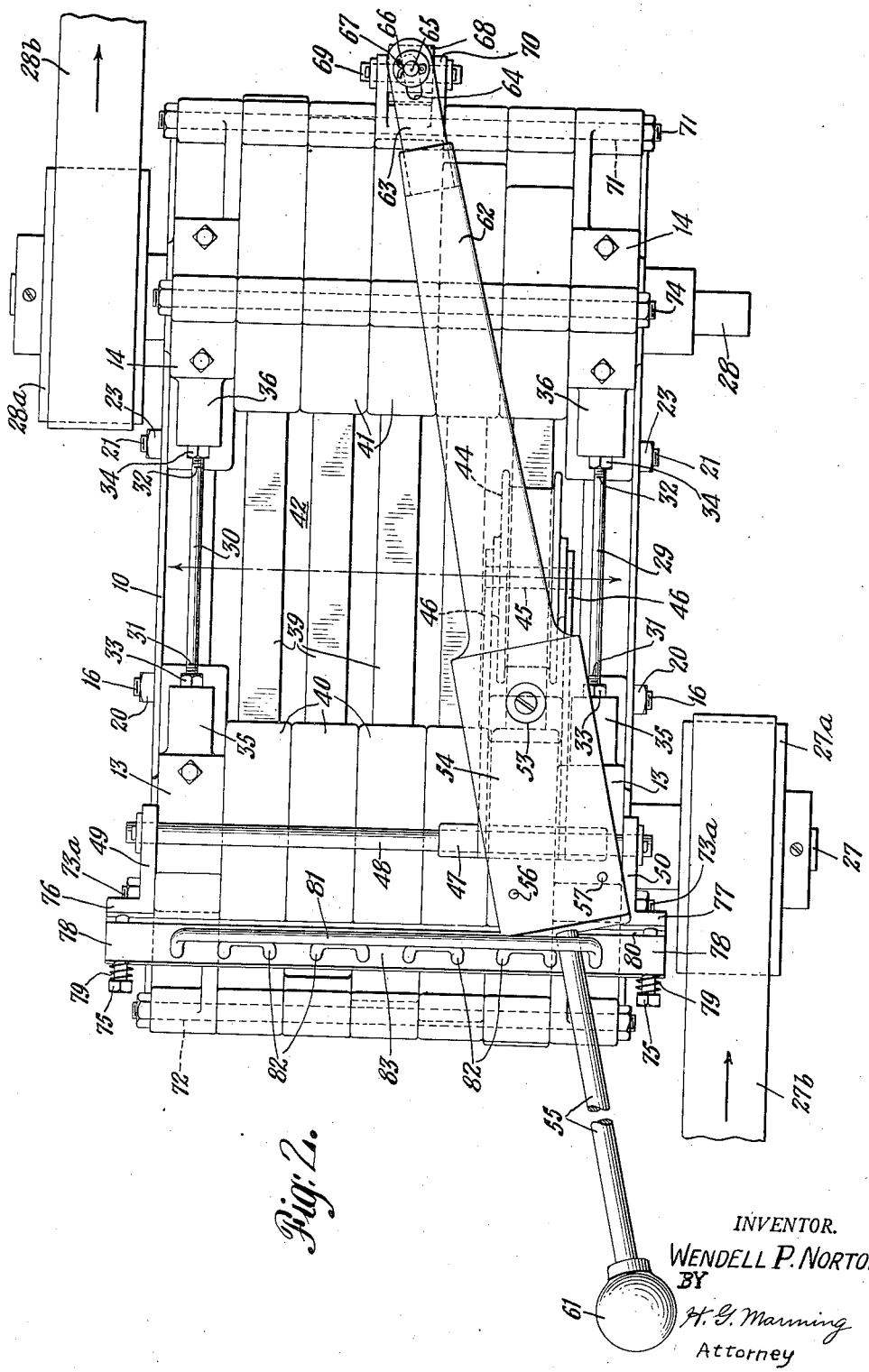
Fig. 2 is a top plan view of the same.

The end frames 13, 13 are mounted for a limited longitudinal adjustment on bolts 15, 16 located in slots 17, 18, and are adapted to be securely held in adjusted position by nuts 19, 20, as clearly shown in Figs. 1 and 2. The end frames 14, 14 are fixed in position, and are held together by means of a pair of stationary bolts 21, 22, and nuts 23, 24.

Power is received from a driving pulley 27a and transmitted to a driven pulley 28a by means of two oppositely arranged stepped pulley cones (herein shown as having five steps on each cone), indicated generally by the numerals 25, 26, said cones being mounted upon a pair of parallel shafts 27, 28. The pulley 27a receives power from a drive belt 27b, and the driven pulley 28a delivers power to a driven belt 28b connected to the lathe or other driven machine. It will be understood, of course, that instead of using the belt 27b, the pulley shaft 27 may be driven directly from an electric motor or other suitable source of power, if desired.

Provision is also made of a pair of parallel horizontal adjusting rods 29, 30 which serve to connect the inner portions of the end frames 13, 13 and 14, 14 as clearly shown in Figs. 1 and 2. The rods 29, 30 have threaded ends 31, 32 which are adapted to be screwed into extensions 35, 35 and 36, 36 of said end frames 13, 13 and 14, 14. The rods 29, 30 are held in adjusted position by means of lock nuts 33, 34 which are adapted to abut against said extensions 35, 36 as shown.

Figure 3:
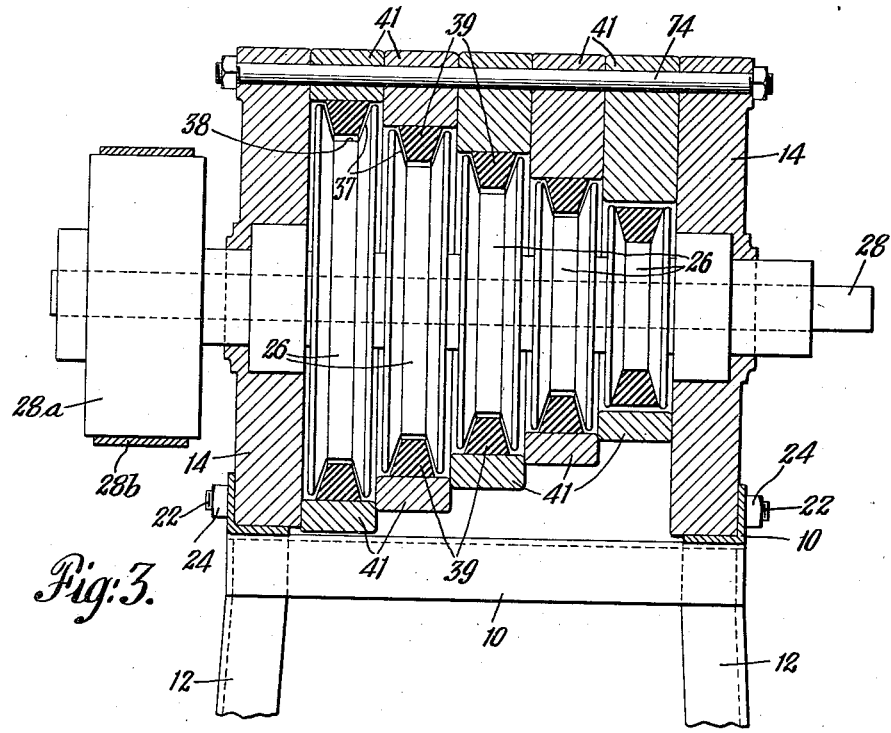
Fig. 3 is a vertical sectional view, taken along the line 3—3 of Fig. 1, looking in the direction of the arrows.

Each step of the cones 25, 26 is provided with a V-shaped groove 37 on its periphery, said groove having a flat bottom 38, as clearly shown in Fig. 3 of the drawing. The pulleys are adapted to receive a set of parallel endless normally circular belts 39 of trapezoidal cross section, each belt 39, when tightened, being adapted to fit the V-shaped grooves 37 in the pair of pulleys associated with said belt.

Surrounding the belts 39 are a pair of oval-shaped sectional two-part casings 40, 41, which are spaced apart at the top by a wide slot 42, and at the bottom by a narrow slot 43, as clearly shown in Figs. 1, 6, and 7. Each belt 39 is adapted to be forced from the idle oval position shown in Fig. 6, where it is in contact with said casings 40, 41, to the operating position shown in Fig. 7 into driving contact with a pair of steps on the cones 25, 26, by means of an idler pulley 44 mounted upon a vertically movable horizontal shaft 45. The shaft 45 is carried on one end of a pair of parallel short vertically swinging arms 46, the other ends of said arms being connected to an elongated bushing 47 having a sliding fit upon a cross rod 48, the latter being rigidly mounted at its opposite ends in a pair of angle brackets 49, 50 secured to the end frames 13, 13.

The arms 46, intermediate their ends, are provided with a horizontal pivot stud 51 which is connected to a vertical upstanding post 52, the upper end of which carries a pin 53 which is adapted to swivel in a heavy rectangular block 54 formed at an intermediate point in an inclined shifting lever 55. The block 54 is provided with a pair of upstanding vertical pins 56, 57 for detachably receiving an additional weight (or weights) 58 having holes 59, 60 shaped to fit loosely over said pins 56, 57.

It will be obvious, of course, that spring pressure may be employed instead of weights for this purpose, as would be the case if the machine were located with the shafts of the stepped cones in a vertical position.

The shifting lever 55 is provided on its free upper end with a handle knob 61 for convenience in the manipulation thereof. The lower end of the shifting lever 55, opposite from the knob 61, is provided with an inclined section 62 to which is attached an S-shaped pivot bar 63 having an elongated slot 64 embracing a vertical pivot stud 65 held within said slot 64, by means of a washer 66 and a cotter pin 67. The stud 65 projects upwardly from a depending squared block 68 which is adapted to rock on a horizontal stud 69 carried in the end of a U-shaped inclined supporting bracket 70 embracing a cross bolt 71 outside the casing 41.

A cross bolt 72 is also located upon the other end of the transmission for connecting the ends of a pair of inclined arms 73 outside the casing 40. Provision is also made of two upper cross bolts 73a, 74 which serve to connect the upper portions of the casings 40, 41.

Figure 4:
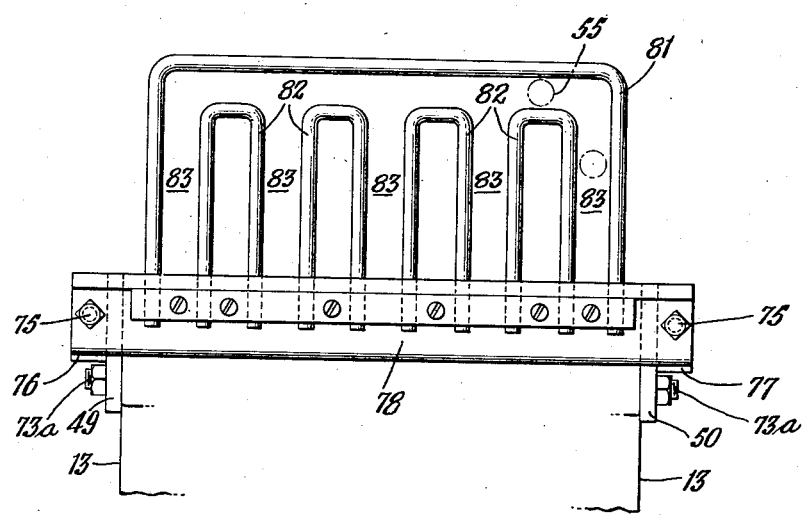
Fig. 4 is a detail sectional view, taken along the line 4—4 of Fig. 1.

In order to reduce or dampen the vibration caused by unevenness in the belts, provision is made of a pair of headed bolts 75 screwed into a pair of outstanding ears 76, 77 of the angle brackets 49, 50 (see Figs. 1, 2 and 4). An elongated S-shaped presser foot bar 78 is resiliently pressed against said ears 76, 77 by a pair of coiled springs 79 surrounding said bolts 75, said presser foot bar 78 having inturned toes 80 for engaging the ears 76, 77 mentioned above.

The presser foot bar 78 has connected to its horizontal upper end an upstanding inverted U-shaped guide rod 81 and four narrow inverted U-shaped rods 82 embraced by the rod 81, and forming a series of five vertical slots 83 which serve to hold the shifting lever 55 in alignment with any one of the five belts 39 of the machine, as desired.

*Operation*

In operation, the normally circular belts 39 will be confined within their oval-shaped guard casings 40, 41 in such a manner that when said belts are not in use they will press outwardly against said guards and assume an oval shape, as clearly shown in Fig. 6. When it is desired to put one of the belts 39 into use, the shifting arm 55 will be swung laterally into alignment with the desired belt 39, and then pushed downwardly to cause the idler pulley 44 to engage said belt. This action will cause the slack in the selected belt 39 to be taken up, and the weighted idler pulley 44 will continue to hold said belt in engagement with both of the aligned outer driving pulleys of the cones 25, 26, as long as the lathe or other power-driven machine remains in use.

To release the belt, it will merely be necessary to swing the shifting lever 55 upwardly out of its slot 83 by means of the handle knob 61, whereupon said lever may be swung laterally to one side or the other to bring the idler pulley 44 into alignment with any other belt 39, as may be desired.

While there has been disclosed in this specification one form in which the invention may be embodied, it is to be understood that this form is shown for the purpose of illustration only and that the invention is not to be limited to the specific disclosure, but may be modified and embodied in various other forms without departing from the spirit. In short, the invention includes all the modifications and embodiments coming within the scope of the following claims.

Having thus fully described the invention, what is claimed as new, and for which it is desired to secure Letters Patent, is:

1. In a variable speed power transmission, a frame; a set of constantly-rotated stepped cones; an opposed set of stepped driven cones parallel to said first set, a set of guard casings embracing said first set of stepped cones and spaced from said cones, a second set of guard casings embracing said second set of stepped cones and spaced therefrom, a set of parallel spaced endless belts, one of which is located in alignment with each pair of aligned cone steps, said belts having sufficient stiffness and resiliency to normally press outwardly and engage the inner surfaces of said casings when out of use, an idler pulley, and an elongated manually-operated shifting lever pivoted on said frame and connected to said idler pulley to slide it laterally into alignment with any one of said belts and then move it downwardly to force said aligned belt into engagement with the associated pulleys on said stepped cones.

2. The invention as defined in claim 1, in which said lever has a loose sliding engagement at its fulcrum point on said frame.

3. The invention as defined in claim 1, in which means are provided on said shifting lever to control the pressure of said idler pulley upon said belts.

4. The invention as defined in claim 1, in which a slotted bracket is mounted on the machine frame for holding said shifting lever and idler pulley in alignment with any one of said belts selectively.

5. The invention as defined in claim 1, in which guide means are provided to hold said shifting lever and idler pulley selectively in alignment with one of said belts, and means resiliently engaging said guide means to dampen the vibration of said lever due to unevenness of said belt.

6. In a variable speed power transmission, a frame, a set of constantly-rotated stepped cones, an opposed set of stepped driven cones parallel to said first set, a set of adjustable guard casings embracing the outer ends of said first set of stepped cones and spaced from said cones, a second set of guard casings embracing the outer ends of said second set of stepped cones and spaced therefrom, a set of parallel spaced endless belts, one of which is located in alignment with each pair of aligned cone steps, said belts having sufficient stiffness and resiliency to normally press outwardly and engage the inner surfaces of said casings when out of use, an idler pulley, and a manually-operated shifting lever pivoted to said frame to move said idler pulley into alignment with any one of said belts and thereafter force said idler pulley downwardly upon said belt to tighten it to cause transmission of power to said driven cone.

7. In a variable speed power transmission, a frame, a set of constantly-rotated stepped cones, an opposed set of stepped driven cones parallel to said first set, two sets of spaced guard casings embracing the opposed ends of said two sets of stepped cones and spaced from said cones, a set of parallel spaced endless belts, one of which is located in alignment with each pair of aligned cone steps, said belts having sufficient stiffness and resiliency to normally press outwardly and engage the inner surfaces of said casings when out of use, an idler pulley, and a manually-operated shifting lever pivoted to said frame to move said idler pulley into alignment with one of said belts and thereafter force it downwardly upon said belt to tighten it to cause transmission of power to said driven cone, said belts being wedge-shaped in cross section and said pulleys having V-shaped grooves shaped to fit said belts.

8. In a variable speed power transmission, a frame, a set of constantly-rotated stepped cones, an opposed set of stepped driven cones parallel to said first set, two sets of spaced guard casings embracing the outer ends of the stepped cones of said sets and spaced from said cones, a set of parallel spaced endless belts, one of which is located in alignment with each pair of aligned cone steps, said belts having sufficient stiffness and resiliency to normally press outwardly and engage the inner surfaces of said casings when out of use, an idler pulley, and a manually-operated shifting lever pivoted to said frame to move said idler pulley into alignment with any one of said belts and thereafter force it downwardly upon said belt to tighten it to cause transmission of power to said driven cone, said guard casings being spaced apart at the top sufficiently to permit said idler pulley to pass down into engagement with said belts.

9. In a variable speed power transmission, a frame, a set of constantly-rotated stepped cones, an opposed set of stepped driven cones parallel to said first set, two sets of spaced guard casings embracing the outer ends of the stepped cones of said sets and spaced from said cones, a set of parallel spaced endless belts, one of which is located in alignment with each pair of aligned cone steps, said belts having sufficient stiffness and resiliency to normally press outwardly and engage the inner surfaces of said casings when out of use, an idler pulley, and an elongated manually-operated shifting lever pivoted on said frame, a short lever also pivoted on said frame for connecting said idler pulley to said shifting lever whereby the latter may be moved laterally into alignment with any one of said belts and then moved downwardly to force said aligned belt into engagement with the associated pulleys on said stepped cones.

10. The invention as defined in claim 9, in which provision is made of a vertical post swiveled in said shifting lever and connected to said swinging lever between the ends thereof.

11. The invention as defined in claim 9, in which provision is made of a cross rod mounted in said frame, and a bushing slidably mounted on said cross rod and connected to said swinging lever to form a fulcrum therefor.

12. In a variable speed power transmission, a frame, a set of constantly-rotated stepped cones, an opposed set of stepped driven cones parallel to said first set, two sets of spaced guard casings surrounding the stepped cones of said sets respectively and spaced from said cones, a set of parallel spaced endless belts, one of which is located in alignment with each pair of aligned cone steps, said belts having sufficient stiffness and resiliency to normally press outwardly and engage the inner surfaces of said casings when out of use, an idler pulley, means to move said idler pulley into alignment with one of said belts and thereafter force it downwardly upon said belt to tighten it to cause transmission of power to said driven cone, and means to adjust the spacing between said guard casings and shafts to take up for wear.

WENDELL P. NORTON.

REFERENCES CITED

The following references are of record in the file of this patent:

UNITED STATES PATENTS

| Number | Name | Date |
|---|---|---|
| 1,151,837 | Tannewitz | Aug. 31, 1915 |
| 897,826 | Gilbert | Sept. 1, 1908 |
| 499,159 | Crafts | June 6, 1893 |
| 2,047,362 | Dunford | July 14, 1936 |